Patented May 15, 1928.

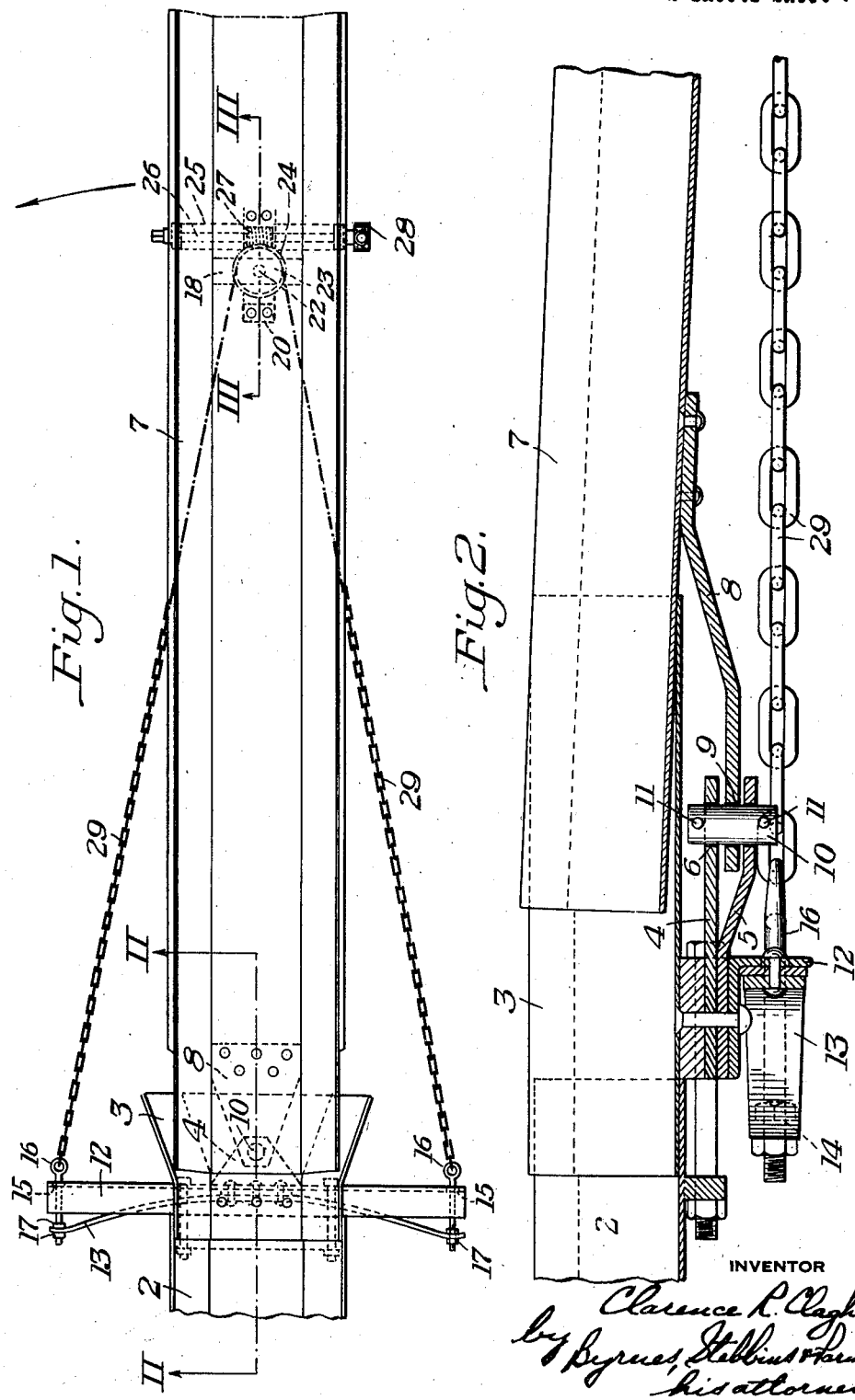

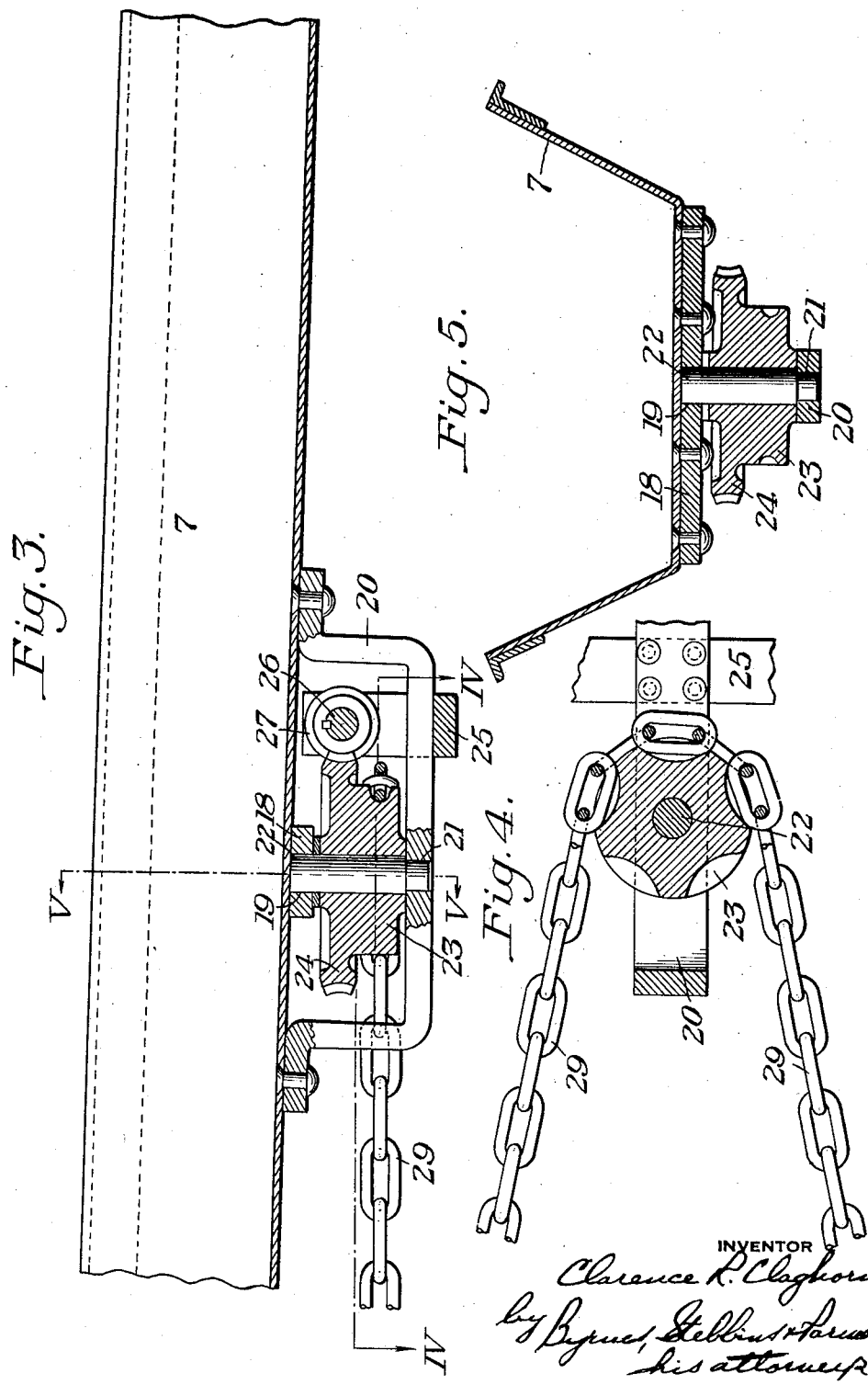

1,669,590

UNITED STATES PATENT OFFICE.

CLARENCE R. CLAGHORN, OF BALTIMORE, MARYLAND.

CONVEYER.

Application filed October 19, 1926. Serial No. 142,609.

This invention relates to conveyers, and more particularly to conveyers having an adjustable terminal thereon arcuately movable within certain limits to different angular positions.

My invention is particularly adaptable for use in mines for conveying materials such as dirt and ore, and particularly in the mining of low coal where head room is necessarily limited.

I have provided a conveyer comprising a main trough, and an extension thereon mounted for pivotal movement with respect thereto, and means operably associated therewith for adjusting the extension in either direction to the desired position. The invention may be applied to a conveyer of the reciprocating trough type, such as that disclosed in my copending application Serial No. 142,607, filed Oct. 19, 1926, but it is equally applicable to other types of conveyers.

In the accompanying drawings I have illustrated a present preferred form of my invention.

In the drawings:

Figure 1 is a plan view of a conveyer embodying my invention;

Figure 2 is a section taken on the line II—II of Fig. 1;

Figure 3 is a section taken on the line III—III of Fig. 1;

Figure 4 is a section taken on the line IV—IV of Fig. 3; and

Figure 5 is a section taken on the line V—V of Fig. 3.

In the drawings, 2 designates the main portion of a trough for conveying material such as dirt, coal, ore and the like. Bolted or otherwise secured to one end of the trough 2 is a flared end section 3 forming a continuation of the trough and which, to all intents and purposes, may be regarded as integral therewith. Secured to the under side of end 3 are a flat plate 4 and a bent plate 5 (Fig. 2), forming, in effect, a yoke. Each of these members of the yoke has a hole 6 formed therein, said holes being coaxially disposed.

According to the present invention, there is provided an arcuately adjustable trough section 7 for the main conveyer 2. Fastened to the under side of the trough 7 near one end thereof is a bent plate 8, so formed that when the trough 7 rests on the flared end 3, the plate 8 will extend between the yoke members 4 and 5. The plate 8 is provided with a hole 9 of the same size and shape as the holes 6. A pin 10, passing through the holes 6 and 9, is maintained in position by cotter pins 11. This arrangement provides a pivotal connection for the trough 7.

Bolted to the end portion 3 so as to extend laterally in both directions therefrom, as shown in Figure 1, is a cross bar 12, preferably formed of angle iron. Bolted to the bar 12 is a leaf spring 13 of approximately the same length as the bar. Near each end of the spring 13 is a hole 14. In the bar 12 are holes 15 of somewhat greater diameter than the holes 14 and arranged substantially coaxially therewith. Extending through the holes 15 in the bar 12 and the holes 14 in the spring 13 is a pair of eye bolts 16. These bolts are secured to the spring 13 by means of nuts 17.

Bolted underneath the trough 7 at some distance from the pivot 10 is a bar 18 having therein a hole 19. Also bolted to the trough 7 and substantially at right angles to the bar 18 is a U-shaped member 20 having therein a hole 21 disposed substantially coaxially with the hole 19 in the bar 18. The holes 19 and 21 serve as bearings for a shaft 22 which is freely rotatable therein. Keyed to the shaft 22 is a sprocket 23 which may be of any desired type, such as a pocket sprocket (Fig. 4). Also keyed to the shaft 22 is a worm wheel 24. The sprocket and worm wheel may be formed integrally if desired, as shown in Figs. 3 and 5. Bolted to the member 20 so as to extend transversely thereof is a U-shaped bar 25. Journaled in coaxial holes in the upstanding portions of the bar 25 is a shaft 26. Keyed to the shaft 26 is a worm 27 which meshes with the worm wheel 24. The ends of the shaft 26 extend laterally from the trough 7 and are squared for the reception of suitable handles or cranks 28 for turning the worm in either direction as desired.

Fastened at each end to an eye bolt 16 is a chain 29 which is in engagement with the sprocket 23 intermediate its ends. While I have herein shown and described a chain and sprocket, it is to be understood that I may provide any equivalent means in place thereof, such as a rope or cable and suitable rotatable gripping means. The term "chain" as used in the claims comprehends any such means adapted to act in tension for the purpose desired.

The operation of my improved conveyer is as follows: A handle or crank is placed on one or both ends of the shaft 26 and the worm 27 turned thereby in a desired direction. Assuming the shaft 26 to be turned in a clockwise direction (Fig. 3), the worm wheel 24 and consequently the shaft 22 will be caused to rotate in a clockwise direction (Fig. 1). The sprocket 23 being in gripping relationship with the chain 29, such rotation will cause the chain to be tensioned between the sprocket and the upper eye bolt 16 (Fig. 1). This tension will cause the one portion of the leaf spring 13 to be placed under tension and when sufficient stress has been set up in the chain by rotation of the sprocket, the trough 7 will be caused thereby to swing about its pivot 10 in the direction of the arrow in Fig. 1. Rotation of the shaft 26 in the opposite direction will cause the other portion of the chain and leaf spring to be placed under tension and the trough 7 to swing in the opposite direction. It will thus be seen that by my invention the movable trough 7 may be moved pivotally in either direction about its connection with the trough 2 by means which are a part of the conveyer structure.

As the angle between the movable trough and the fixed trough changes, the effective length of the chain 29 also changes. This is by reason of the fact that the sum of the lengths of two adjacent sides of a triangle is variable as the angle between them changes, the lengths of the third side and the median to the center of the third side remaining constant. In order to compensate for this change in the effective length of the chain, the leaf spring 12 is provided. It is of such strength that it will withstand the working tension necessarily applied to the chain in order to move the trough 7 and at the same time will yield sufficiently to compensate for the change in effective length of the chain as the angle between the two troughs changes.

The principal advantage of the invention resides in the provision of a mechanism by means of which the adjustable terminal of a conveyer may be conveniently moved and held in a desired angular relation with the main conveyer. Another advantage is the provision of such a means which is relatively simple and rugged in its construction and wherein the chains or other flexible connections will permit of the angular change in the position of the adjustable terminal without the chains ever being loose at any time. A particular advantage resides in the worm gear mechanism for the adjustment because it will positively hold the terminal portion of the conveyer in the position to which it moved.

I have shown and described a preferred embodiment of my invention but it is to be understood that it is not limited to the form shown, but may be otherwise embodied within the scope of the following claims.

I claim:

1. A conveyer comprising a fixed trough, a movable trough mounted for pivotal movement with respect thereto, and means operably associated with said troughs for pivotally moving said movable trough.

2. A conveyer comprising a fixed trough, a movable trough mounted for pivotal movement with respect thereto, and means operably associated with said fixed trough for engaging said movable trough at a point removed from its connection with said fixed trough to move it pivotally in either direction.

3. A conveyer comprising a fixed trough, a movable trough mounted for pivotal movement with respect thereto, and a chain connected to said fixed trough and operably associated with said movable trough for moving it pivotally in either direction.

4. A conveyer comprising a fixed trough, a movable trough mounted for pivotal movement with respect thereto, a chain one portion of which is connected with said fixed trough and another portion with said movable trough, and means for tensioning said chain to pivotally move said movable trough.

5. A conveyer comprising a fixed trough, a movable trough mounted for pivotal movement with respect thereto, gripping means on said movable trough, connectors resiliently connected with said fixed trough and engaged by said gripping means, and means for moving said gripping means to cause motion of said movable trough.

6. A conveyer comprising a fixed trough, a movable trough mounted for pivotal movement with respect thereto, a chain connected at both ends to said fixed trough, chain engaging means on said movable trough engaging said chain intermediate its ends, and means for moving said chain engaging means to cause motion of said movable trough.

7. A conveyer comprising a fixed trough, a movable trough mounted for pivotal movement with respect thereto, and means connecting said troughs at points respectively removed from their pivotal connection for pivotally moving said movable trough.

8. A conveyer comprising a fixed trough, a movable trough pivotally connected thereto, a chain resiliently connected to said fixed trough at two points removed from the pivotal connection of said troughs and on opposite sides thereof, means on the movable trough forwardly of the pivotal connection between the troughs operably engaging the chain between its ends, and operating means therefor.

9. A conveyer comprising a fixed trough, a movable trough pivotally connected thereto, a chain connected at both ends to said fixed trough at points on opposite sides of the pivotal connection of said troughs, a sprocket on said movable trough for engaging said chain intermediate its ends, and means for rotating said sprocket to move said movable trough.

10. A conveyer comprising a fixed trough, an arcuately movable trough connected therewith, a chain connected with said fixed trough, a sprocket on said movable trough for engaging said chain, and means for rotating said sprocket to tension said chain for moving said movable trough.

11. A conveyer comprising a fixed trough, an arcuately movable trough connected therewith, a chain resiliently connected at both ends to said fixed trough at points on opposite sides of the connection of said troughs, a sprocket on said movable trough for engaging said chain intermediate its ends, and means for rotating said sprocket in either desired direction to cause said chain to move relatively thereto for moving said movable trough in the direction of tension of said chain.

12. A conveyer comprising a fixed trough, an arcuately movable trough connected therewith, a chain resiliently connected at both ends to said fixed trough at points on opposite sides of the connection of said troughs, a sprocket on said movable trough for engaging said chain intermediate its ends, and means including a worm gear for rotating said sprocket in either desired direction to cause said chain to move relatively thereto for moving said movable trough in the direction of tension of said chain.

13. A conveyer comprising a fixed trough, a movable trough mounted for pivotal movement with respect thereto, a spring on said fixed trough, a chain connected to both ends of said spring, and means on said movable trough for engaging said chain to tension it in a desired direction for moving said movable trough.

14. A conveyer comprising a fixed trough, a movable trough mounted for pivotal movement with respect thereto, a chain connected to said fixed trough at points on opposite sides of the pivotal connection of said troughs, a sprocket on said movable trough for engaging said chain, a gear carried by the sprocket, and a worm for turning said gear in either desired direction to correspondingly move the movable trough.

15. The combination with a main conveyer, of an arcuately adjustable section at the terminal thereof, an operating means on the adjustable section, and a flexible connection engaged by the operating means extending to points on opposite sides of the main conveyer.

16. In a conveyer, a main section and a terminal section, said terminal section being arcuately adjustable with respect to the main section, an operating gear on one section, and a flexible connection engaged by the operating gear extending from the operating gear to spaced apart points on the other section.

17. In a conveyer, a main section, a terminal section pivotally connected with the main section, operating means associated with the two sections for pivotally moving the latter with respect to the former, said operating means being resiliently connected with at least one of the sections.

18. A conveyer comprising relatively pivotally mounted trough sections, and means fastened to one of such sections and connected to the other for effecting relative pivotal movement therebetween.

In testimony whereof I have hereunto set my hand.

CLARENCE R. CLAGHORN.